(12) United States Patent
Lin et al.

(10) Patent No.: US 12,379,846 B2
(45) Date of Patent: Aug. 5, 2025

(54) SYNCHRONOUSLY PROGRAMMING MULTIPLE MEMORY DEVICES

(71) Applicant: Quanta Computer Inc., Taoyuan (TW)

(72) Inventors: Wei-Hung Lin, Taoyuan (TW); Yen-Ping Tung, Taoyuan (TW); Han-Chuan Tsai, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 134 days.

(21) Appl. No.: 18/147,124

(22) Filed: Dec. 28, 2022

(65) Prior Publication Data
US 2024/0220113 A1    Jul. 4, 2024

(51) Int. Cl.
*G06F 3/06* (2006.01)

(52) U.S. Cl.
CPC ............ *G06F 3/0611* (2013.01); *G06F 3/064* (2013.01); *G06F 3/0659* (2013.01); *G06F 3/0679* (2013.01)

(58) Field of Classification Search
CPC ...... G06F 3/0611; G06F 3/064; G06F 3/0659; G06F 3/0679
USPC .......................................................... 711/103
See application file for complete search history.

(56) References Cited

U.S. PATENT DOCUMENTS

| | | |
|---|---|---|
| 7,307,884 B2 | 12/2007 | Guterman |
| 2016/0170871 A1 | 6/2016 | Hyun et al. |
| 2019/0227783 A1* | 7/2019 | Chang .................... G06F 21/64 |
| 2021/0389949 A1* | 12/2021 | Stoller .................. G06F 3/0679 |
| 2022/0020403 A1* | 1/2022 | Limaye .................... G11C 5/06 |
| 2022/0269600 A1 | 8/2022 | Huang |
| 2023/0185669 A1* | 6/2023 | Tabuki ................ G06F 11/1417 717/168 |
| 2024/0103846 A1* | 3/2024 | Paulraj .................... G06F 8/656 |

FOREIGN PATENT DOCUMENTS

| | | |
|---|---|---|
| TW | 200623136 A | 7/2006 |
| TW | 202230136 A | 8/2022 |

OTHER PUBLICATIONS

TW Office Action for Application No. 112112117, mailed Nov. 29, 2023, w/ First Office Action Summary.
TW Search Report for Application No. 112112117, mailed Nov. 29, 2023, w/ First Office Action.

* cited by examiner

*Primary Examiner* — Gautam Sain
(74) *Attorney, Agent, or Firm* — NIXON PEABODY LLP

(57) ABSTRACT

An example computer-implemented method for synchronously programming multiple memory modules includes sending one or more instructions to each of the memory modules to perform a first data operation associated with a computer software update. In response to determining that each of the memory modules have received the first instructions to perform the first data operation, time is spent waiting for the first data operation to be completed at each of the memory modules. One or more instructions are also sent to each of the memory modules to perform a second data operation associated with the computer software update. In response to determining that each of the memory modules have received the second instructions to perform the second data operation, time is spent waiting for the second data operation to be completed at each of the memory modules. Furthermore, the data is validated across the memory modules.

20 Claims, 5 Drawing Sheets

SYNCHRONOUSLY PROGRAMMING MULTIPLE MEMORY DEVICES

TECHNICAL FIELD

The present invention relates to data storage systems, and more particularly, to synchronously programming multiple memory devices.

BACKGROUND

Non-volatile memory is a type of memory which retains information stored thereon even after the power supply is turned off, and includes a number of different forms. Some types of non-volatile memory are random access, allowing for data to be read and changed in any order. Using flash memory as an example of random access non-volatile memory, the performance characteristics of conventional NAND flash-based solid state drives (SSDs) are fundamentally different from those of traditional hard disk drives (HDDs). Data in conventional SSDs is typically organized in pages of 4, 8, 16, etc. Kilobyte (KB) sizes. Moreover, page read operations in SSDs are typically one order of magnitude faster than write operations and latency neither depends on the current nor the previous location of operations.

Another notable characteristic of memory like flash, is that data is erased, written, and read in blocks of memory. These blocks include a plurality of pages, and the blocks effectively define the minimum unit of memory that can be acted on. For example, all pages in a block of memory are erased together as a result of implementing a flash erase operation.

As noted above, each block includes a plurality of pages, and therefore larger blocks correspond to a greater number of pages therein. It follows that as the size of blocks continue to increase, so does the amount of latency involved with performing each flash operation (e.g., flash erase operation). As a result, conventional implementations of flash have undesirably experienced performance inefficiencies increase over time.

Thus, there is a need for methods, computer program products, and systems that is able to utilize memory efficiently despite increasing sizes of memory blocks. Moreover, these improvements must be achieved without negatively affecting performance of the system.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

It should also be noted that while various embodiments herein are described in the context of flash memory, this is in no way intended to be limiting. Embodiments herein may be implemented in systems having any desired type of random access, non-volatile memory that would benefit from the various achievements herein, e.g., as would be appreciated by one skilled after reading the present description.

An example computer-implemented method for synchronously programming multiple memory modules. The computer-implemented method includes sending one or more first instructions to each of the memory modules to perform a first data operation associated with a computer software update. In response to determining that each of the multiple memory modules has received the first instructions to perform the first data operation, time is spent waiting for the first data operation to be completed at each of the multiple memory modules. One or more second instructions are also sent to each of the multiple memory modules to perform a second data operation associated with the computer software update. In response to determining that each of the multiple memory modules has received the second instructions to perform the second data operation, time is spent waiting for the second data operation to be completed at each of the multiple memory modules. Furthermore, data is validated across the memory modules.

In some implementations the computer-implemented method above, sending the one or more first instructions to perform the first data operation, includes: sending the one or more first instructions to a first memory module of the multiple memory modules to perform the first data operation, advancing to a second memory module of the multiple memory modules, and sending one or more first instructions to the second memory module to perform the first data operation. Some implementations of the computer-implemented method further include repeating a process in an iterative fashion. The process includes determining whether each of the multiple memory modules has been instructed to perform the first data operation, advancing to a next memory module of the multiple memory modules in response to determining that each of the multiple memory modules has not been instructed to perform the first data operation, and sending the one or more first instructions to the next memory module of the multiple memory modules to perform the first data operation.

In some implementations the computer-implemented method includes outputting a warning that the computer software update was not successful in response to the data validation failing. In some implementations, the first data operation is an erase operation associated with a firmware update. Moreover, the second data operation is a write operation associated with the firmware update in some implementations.

Validating the data across the multiple memory modules may include sending one or more third instructions to perform a third data operation associated with the computer software update, the one or more third instructions being sent to each of the multiple memory modules. For instance, in some implementations, the third data operation is a verify read operation. It should also be noted that each of the multiple memory modules includes random access non-volatile memory. In some implementations, the random access non-volatile memory is flash memory. Moreover, the operations included herein may be performed by a central controller selectively given access to the flash memory.

An example computer program product is for synchronously programming multiple memory modules. The computer program product includes a computer readable storage medium having program instructions embodied therewith. Moreover, the program instructions are readable and/or executable by a processor to cause the processor to: perform the foregoing method.

An example system includes a plurality of memory modules, each of the memory modules having a plurality of random access non-volatile memory blocks configured to store data. The system further includes a processor, and logic integrated with and/or executable by the processor. Moreover, the logic is configured to: perform the foregoing method The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1A:
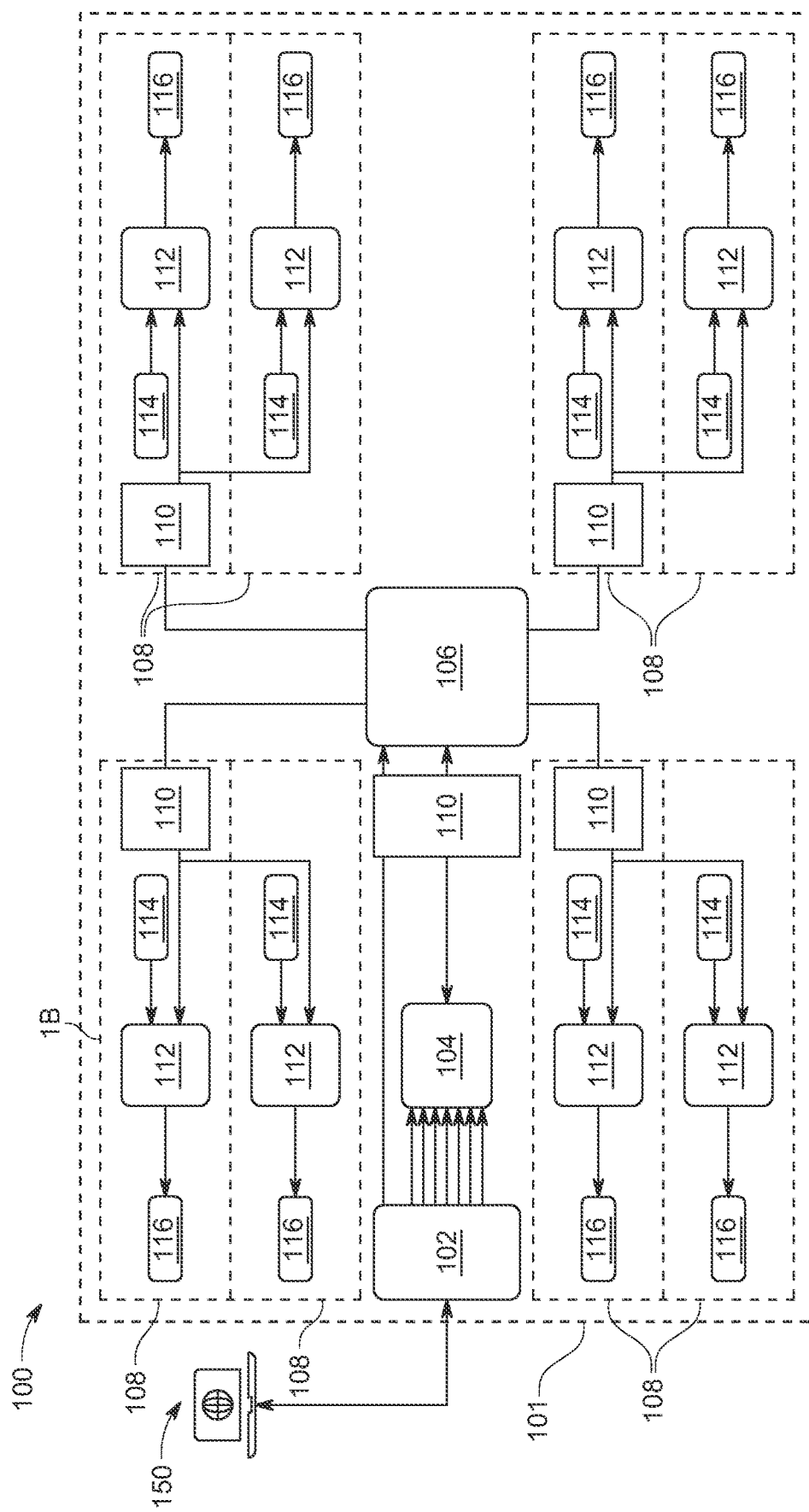
FIG. 1A is a representational view of a system architecture, according to certain aspects of the present disclosure.

The present disclosure is directed toward a computer-implemented method for synchronously programming multiple memory modules. The computer-implemented method includes sending one or more first instructions to each of the memory modules to perform a first data operation associated with a computer software update. In response to determining that each of the multiple memory modules has received the first instructions to perform the first data operation, time is spent waiting for the first data operation to be completed at each of the multiple memory modules. One or more second instructions are also sent to each of the multiple memory modules to perform a second data operation associated with the computer software update. In response to determining that each of the multiple memory modules has received the second instructions to perform the second data operation, time is spent waiting for the second data operation to be completed at each of the multiple memory modules. Furthermore, data is validated across the memory modules.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical", "horizontal", "parallel", and "perpendicular" are intended to additionally include "within 3-5% of" a vertical, horizontal, parallel, or perpendicular orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

As previously mentioned, performance characteristics of conventional flash-based memory is fundamentally different from those of traditional non-volatile memory, e.g., such as HDDs. For instance, data in flash is erased, written, and read in blocks of memory, which effectively define the minimum unit of memory that can be acted on. For example, all pages in a block of memory are written together as a result of implementing a flash write operation.

As noted above, each block includes a plurality of pages, and therefore larger blocks correspond to a greater number of pages therein. It follows that as the size of blocks continue to increase, so does the amount of latency involved with performing each flash operation (e.g., flash erase operation). Moreover, these performance issues are compounded in systems that implement data operations across multiple memory modules. As a result, conventional implementations of flash have undesirably experienced performance inefficiencies increase over time.

In sharp contrast to these conventional shortcomings, various ones of the embodiments described herein are able to reduce latency without negatively affecting performance of the system. This is accomplished at least in part by performing a same number of steps (e.g., operations) in a shorter amount of time than conventionally possible, e.g., as will be described in further detail below.

FIG. 1A depicts the architecture of a system 100, in accordance with one embodiment. It should be noted that although system 100 is depicted as an exemplary non-volatile data storage implementation in the present embodiment, various other types of non-volatile data storage configurations may be used according to alternate embodiments. It follows that the architecture and/or components of system 100 are in no way intended to limit the invention, but rather have been presented as a non-limiting example.

Moreover, as an option, the present system 100 may be implemented in conjunction with features from any other embodiment listed herein, such as those described with reference to the other FIGS. However, such system 100 and others presented herein may be used in various applications and/or in permutations which may or may not be specifically described in the illustrative embodiments listed herein. Further, the system 100 presented herein may be used in any desired environment.

System 100 is shown as being connected to a network 150. The network 150 may be of any type, e.g., depending on the desired approach. For instance, in some approaches the network 150 is a WAN, e.g., such as the Internet. However, an illustrative list of other network types which network 150 may implement includes, but is not limited to, a LAN, a PSTN, a SAN, an internal telephone network, etc. Accordingly, the system 100 is able to communicate with other devices connected to the same network regardless of the amount of separation which exists therebetween, e.g., despite being positioned at different geographical locations.

The system 100 may be coupled to the network 150 using a wireless connection, e.g., WiFi, Bluetooth, a cellular network, etc.; a wired connection, e.g., a cable (Ethernet cable), a fiber-optic link, a wire, etc., or any other type of connection which would be apparent to one skilled in the art after reading the present description. Moreover, the various components and connections shown in the system 100 may be implemented in any desired environment. For example, the various components and connections shown in the system 100 may be implemented on a server board of a desired type.

Information received from the network 150 is received at a central controller 102. The controller 102 is able to process the information (e.g., data, updates, commands, requests, instructions, etc.) received, and cause corresponding actions to take place, e.g., as will be described in further detail below with respect to method 200 in FIG. 2A. In some approaches, the controller 102 includes a baseboard management controller (BMC) configured to receive and process information from the network 150, as well as control the various components included in the system 100. However, any desired type of controller may be implemented.

The controller 102 is coupled (e.g., electrically coupled) to a processor 104 and a multiplexer 106. The processor 104 is also coupled to the multiplexer 106. Accordingly, the multiplexer 106 is able to receive updates, commands, data, updates, instructions, etc. directly from the controller 102 and/or the processor 104. In an example, which is in no way intended to limit the invention, the controller 102 may send clock information directly to the multiplexer 106, while chip select information for directing data commands to the proper location in the system 100 is first sent to the processor 104. The processor 104 may use the chip select information to form commands that are then sent to the multiplexer 106 to be distributed across the system 100.

In some instances, the processor 104 may be a complex programmable logic device (CPLD), while in other approaches the processor 104 may include a field-programmable gate array (FPGA), one or more Programmable Array Logic (PAL) modules, etc., or any other desired type of processing circuit(s), chip(s), and/or module(s) implemented in hardware and/or software. It should be noted that the updates, commands, information, requests, data, etc. may be sent and/or received inside system 100 according to any desired protocol, interface, etc. For example, in some approaches the components in system 100 communicate according to the Serial Peripheral Interface (SPI), e.g., as would be appreciated by one skilled in the art after reading the present description.

With continued reference to FIG. 1A, the multiplexer 106 is coupled to a number of different memory modules 108 in the system 100. The memory modules 108 and other components in system 100 are coupled to a common substrate 101 in some implementations. For instance, one or more memory modules 108 and/or other components in system 100 may be physically connected to a common central processing unit (CPU) server board.

Each of the memory modules 108 are depicted as including the same components implemented in the same configuration, but the multiplexer 106 may be coupled to any desired location and/or component in the system 100. It should also be noted that each of the connections to the multiplexer 106 pass through connectors 110. These connectors 110 may be high-volume universal connectors that improve the communication interface between the multiplexer 106 and the various memory modules 108. For example, the connectors 110 may each be a 4C+ high-density connector that provides a stable electrical connection.

With continued reference to FIG. 1A, the memory modules 108 are shown as including a connector 110 that directs information across various components in the module 108. These include a multiplexer (or "mux") 112, a sub-controller 114, and memory 116 itself. In some approaches, the sub-controller 114 is an application-specific integrated circuit (ASIC), but may include different types of controllers in other approaches, e.g., as would be appreciated by one skilled in the art after reading the present description. The sub-controller 114 may thereby receive commands originally sent from the central controller 102, and implement various processes (e.g., data operations) in the memory 116.

The memory 116 preferably includes memory that is random access and non-volatile. According to some approaches, the memory 116 includes flash memory (e.g., NOR and/or NAND flash). In other approaches, the memory 116 may include non-volatile random access memory (NVRAM), or any other desired type of memory (e.g., data storage). For example, one or more of the memory modules may be a data storage location that includes different tiers of storage, each tier corresponding to a type of memory having different performance metrics. Thus, the memory 116 may actually be a tiered combination of NVRAM, HDDs, magnetic tape, optical media, etc.

Figure 1B:
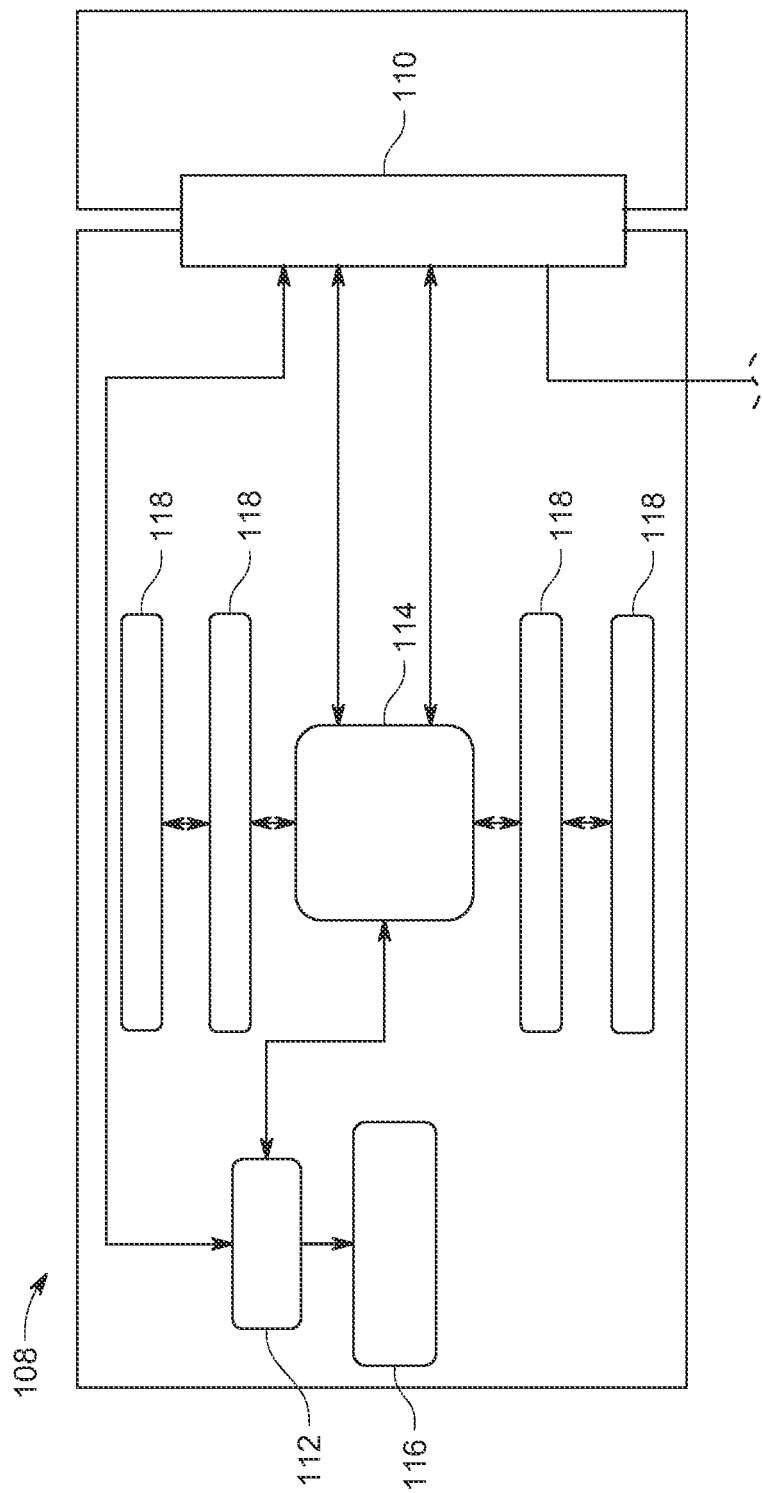
FIG. 1B is a partial detailed view of a memory module of FIG. 1A, according to certain aspects of the present disclosure.

Looking now to FIG. 1B, a detailed view of a memory module 108 in system 100 is illustrated in accordance with one embodiment. Accordingly, various components of FIG. 1B have common numbering with those of FIG. 1A. It should also be noted that while the components and connections illustrated in FIG. 1B are not identical to those shown in the memory modules 108 of FIG. 1A, either configuration may be implemented, e.g., depending on the desired approach.

The memory module 108 in FIG. 1B is connected to a remainder of the system 100 by connector 110. As described above, the connector 110 may be a high-volume universal connector that improves the communication interface between the components in the memory module 108 and the remainder of the system 100. For instance, data, updates, commands, requests, instructions, etc. may be received at the connector 110 and routed to the mux 112 and/or the sub-controller 114. The mux 112 is further connected to the memory 116, while sub-controller 114 is connected to additional memory layers 118. As noted above, memory 116 includes flash in some implementations. The memory layers 118 may also include flash in some implementations. In other implementations, one or more of the layers 118 may include Double Data Rate 5 (DDR5) Dual In-line Memory Modules (DIMMs).

As noted above, the sub-controller 114 is able to receive commands originally sent from the central controller (e.g., see controller 102 of FIG. 1A), and implement various processes (e.g., data operations) in the memory 116. The sub-controller 114 is also preferably able to use the memory layers 118 to perform such processes. For example, one or more of the additional memory layers 118 may be used as a temporary queue, to store a logical-to-physical table (LPT), overflow data storage, etc.

As noted above, updates, commands, information, requests, data, etc. may be sent and/or received between components in system 100 according to any desired protocol, interface, etc. Thus, updates, commands, information, requests, data, etc. may be sent between the various components shown in FIG. 1B according to any desired protocol, interface, etc. For example, in some approaches information may be sent between the sub-controller 114 and mux 112 according to SPI, while information may be sent between connector 110 and sub-controller 114 according to the I2C protocol, Peripheral Component Interconnect Express (PCIe) standard, etc.

According to an in-use example, which is in no way intended to limit the invention, implementing an ASIC sub-controller 114 enables memory expansion by providing 1-4 additional DDR5 DIMMs (e.g., memory layers 118) to the memory module 108. Accordingly, the sub-controller 114 may connect a dual-input/output (I/O) flash memory to store firmware, application configuration, persistent, etc., data. In comparison, the central controller 102 of FIG. 1A may be responsible for updating firmware by connecting to the flash directly through multiplexer 106. The embodiment illustrated in FIGS. 1A-1B includes a total of 4 memory modules 108 connected to the central controller 102, each memory module 108 having sub-controllers 114. This leads to situations where data operations are sent to the memory modules sequentially to ensure data is consistent across the different modules.

It follows that the central controller 102 or corresponding sub-controller 114 may be given control of each memory module depending on the situation. For example, implementing a firmware update successfully across the various memory modules may involve giving the central controller 102 access to memory in each of the modules, while the sub-controllers 114 may have access to memory in the respective modules during normal run time.

Referring back to FIG. 1A, central controller 102 and/or other controllers described herein (e.g., sub-controllers 114) may be able to perform various functions in memory as described herein. Specifically, central controller 102 and/or sub-controllers 114 may include logic configured to perform any one or more of the following functions, which are in no way intended to be an exclusive list. For instance, central controller 102 and/or sub-controllers 114 may additionally include logic configured to perform any one or more of the processes described below with respect to method 200 of FIG. 2A. In other words, depending on the desired approach, logic of a storage system may be configured to perform additional or alternative functions, as would be appreciated by one skilled in the art upon reading the present description.

Garbage Collection

Garbage collection in the context of memory controllers of the present description may include the process of identifying blocks of data to be reclaimed for future usage and relocating all pages that are still valid therein. Moreover, depending on the specific controller and/or the respective garbage collection unit of operation, logical erase blocks (LEBs) may be identified for being reclaimed and/or relocated. Typically, one LEB corresponds to one block stripe, but alternative implementations may consider a fixed number of block stripes building a LEB as well.

A physical "block" represents a minimal unit that may be erased on non-volatile memory, e.g., such as NAND flash memory, and thereby prepared for writing data thereto. However, a typical garbage collection unit of operation is often a multiple of the physical blocks of non-volatile memory, and is also referred to as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary approach, which is in no way intended to limit the invention, sub-controllers (e.g., see sub-controllers 114 of FIGS. 1A-1B) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat separation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired approach, logic of a storage system may be configured to perform additional or alternative functions, as would be appreciated by one skilled in the art upon reading the present description.

Figure 1C:
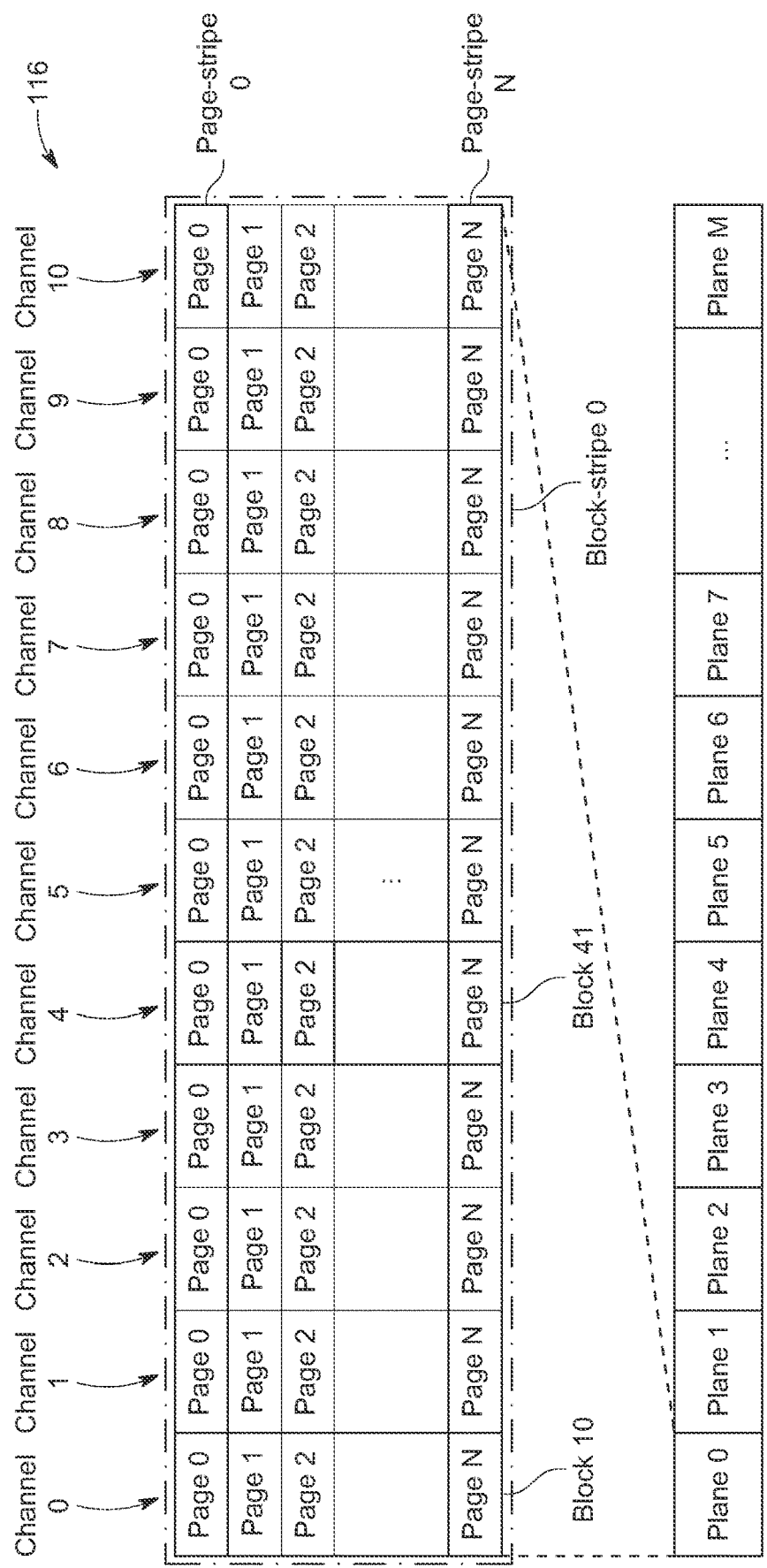
FIG. 1C is a conceptual diagram which includes a block-stripe and page-stripe of memory, according to certain aspects of the present disclosure.

To better understand the distinction between block-stripes and page-stripes as used herein, FIG. 1C is a conceptual diagram of memory 116, in accordance with one approach. LEBs are built from block stripes and typically a single block stripe is used to build a LEB. However, alternative approaches may use multiple block stripes to form an LEB. As an option, the present conceptual diagram of memory 116 may be implemented in conjunction with features from any other approach listed herein, such as those described with reference to the other FIGS. However, such conceptual diagram and others presented herein may be used in various applications and/or in permutations which may or may not be specifically described in the illustrative approaches listed herein. Further, the conceptual diagram of memory 116 presented herein may be used in any desired environment.

As shown in FIG. 1C, the memory 116 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel forms a respective block-stripe. It follows that a number of block-stripes supported by a given approach of non-volatile memory may be determined by the number of blocks per plane and the number of planes.

In the exploded view of Plane 0, the memory 116 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to memory 116, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Figure 2A:
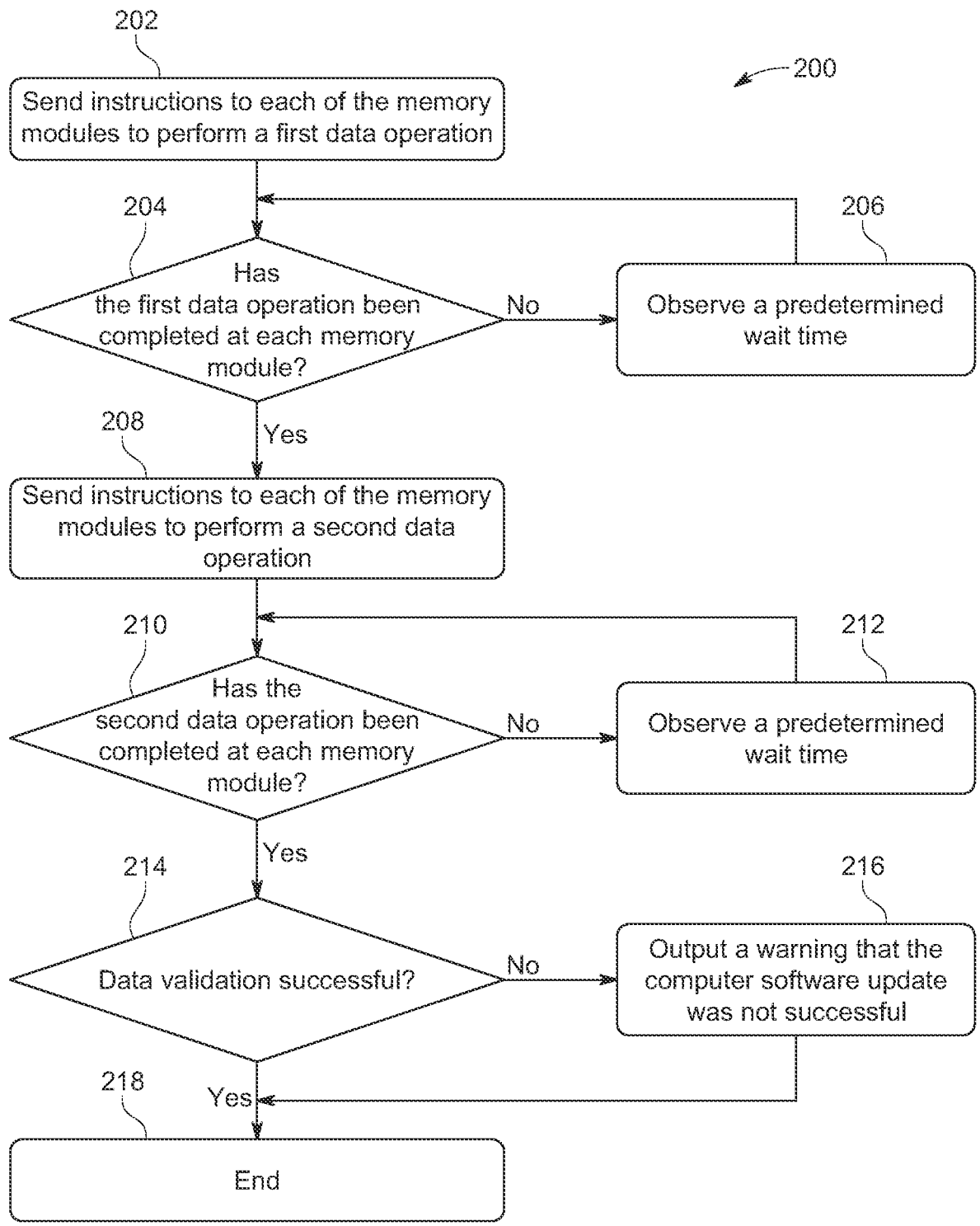
FIG. 2A is a flowchart of an example method for synchronously programming multiple memory modules, according to certain aspects of the present disclosure.

Referring now to FIG. 2A, a flowchart of a method 200 is shown according to one embodiment. The method 200 may be performed in accordance with the present invention in any of the environments depicted in FIGS. 1A-1C, among others, in various embodiments. Of course, more or less operations than those specifically described in FIG. 2A may be included in method 200, as would be understood by one of skill in the art upon reading the present descriptions.

Each of the steps of the method 200 may be performed by any suitable component of the operating environment. For example, in various embodiments, the method 200 may be partially or entirely performed by a controller, a processor, a computer, etc., or some other device having one or more processors therein. Thus, in some embodiments, method 200 may be a computer-implemented method. Moreover, the terms computer, processor and controller may be used interchangeably with regards to any of the embodiments herein, such components being considered equivalents in the many various permutations of the present invention. According to an example, any one or more of the processes included in method 200 may be performed by a central controller (e.g., see controller 102 of FIG. 1A). For instance, in some approaches method 200 may be partially and/or entirely performed by a central controller selectively (e.g., temporarily) given access to the flash memory to accomplish a software update and check.

Moreover, for those embodiments having a processor, the processor, e.g., processing circuit(s), chip(s), and/or module (s) implemented in hardware and/or software, and preferably having at least one hardware component may be utilized in any device to perform one or more steps of the method 200. Illustrative processors include, but are not limited to, a CPU, an application specific integrated circuit (ASIC), a field programmable gate array (FPGA), etc., combinations thereof, or any other suitable computing device known in the art. For instance, any one or more of the processes in method 200 may be performed by central controller 102 and/or sub-controllers 114 of FIG. 1A above.

With continued reference to FIG. 2A, operation 202 of method 200 includes sending instructions to each of the memory modules to perform a first data operation. The type of data operation implemented by the memory modules depends on the situation. For instance, in some approaches the first data operation is an erase operation. In other approaches, the first data operation may be a write operation, a read operation, etc.

The instructions and/or the type of data operation may vary depending on the type of memory included in the memory module. For example, in some approaches each of the memory modules includes random access non-volatile memory (e.g., flash memory). In such approaches, a data erase operation would precede a data write operation, e.g., as would be appreciated by one skilled in the art after reading the present description. The data erase operation may also involve instructing the memory to erase a block of memory that is designated to experience a subsequent write operation.

As noted above, it is important in some approaches that the same data operation is implemented at each of the memory modules. In such approaches, it may be important that certain information (e.g., data, metadata, flags, etc.) are the same across each of the memory modules. According to an example, which is in no way intended to limit the invention, it is desirable that one or more data operations associated with a computer software update are implemented the same across the different memory modules, e.g., such that the software operating at (or in) each of the memory modules is the same or substantially similar. According to another example, which again is in no way intended to limit the invention, it is desirable that redundant copies of data are the same even if stored at different physical locations (e.g., in different memory modules).

Figure 2B:
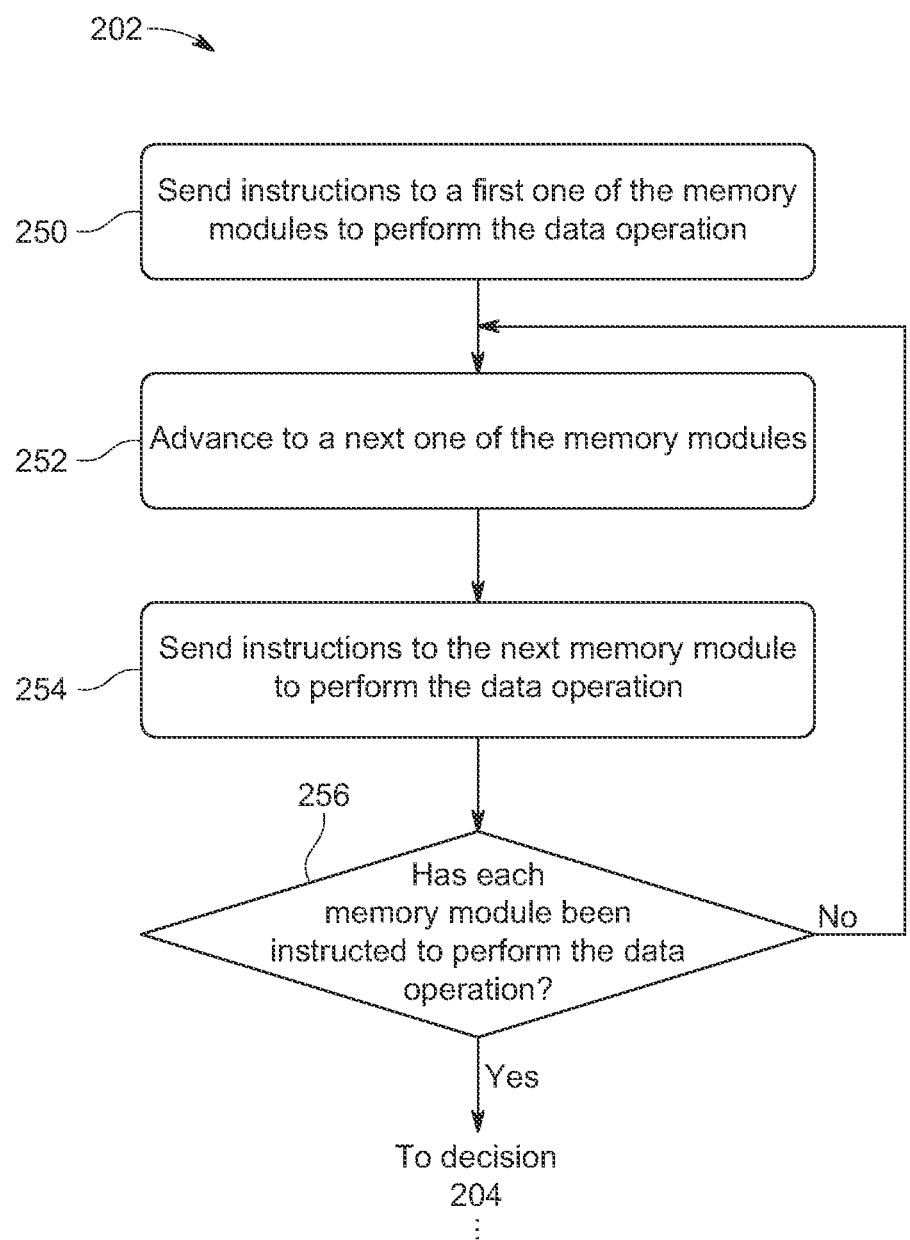
FIG. 2B is a flowchart of sub-operations for one of the operations in the method of FIG. 2A, according to certain aspects of the present disclosure.

Referring momentarily now to FIG. 2B, an exemplary sub-processes of implementing a data operation across each of a plurality of memory modules are illustrated in accordance with one embodiment, one or more of which may be used to perform operation 102 (or similarly operation 208) of FIG. 2A. However, it should be noted that the sub-processes of FIG. 2B are illustrated in accordance with one embodiment which is in no way intended to limit the invention.

As shown, sub-operation 250 includes sending the one or more instructions to a first one of the memory modules to perform the first data operation. The "first one" of the memory modules may be predetermined (e.g., designated) in some approaches, by a user, an administrator, based on the type of data operation, etc. In other approaches, the "first one" of the memory modules may be randomly selected, shifted in an iterative fashion between data operations, etc. It should also be noted that the one or more instructions that are sent to the first memory module may vary depending on the approach. For instance, the type of data operation, memory, operating software, etc. may impact the specific number and/or type of instructions that are sent to the memory module to cause a data operation to be performed.

From sub-operation 250, the flowchart proceeds to sub-operation 252. There, sub-operation 252 includes advancing to a next one of the memory modules. As noted above, the "next" one of the memory modules may be any desired one of the remaining memory modules (i.e., excluding the "first" memory module) and may be selected using any of the approaches described above with respect to the "first" memory module. Moreover, sub-operation 254 includes sending the one or more instructions to the next memory module to perform the first data operation. Again, it is desired that the same data operation(s) are performed at each of the memory modules in some approaches (e.g., such as implementing a firmware update across the memory modules). It follows that sub-operation 254 may be performed using any of the approaches described above with respect to performing sub-operation 250, e.g., as would be appreciated by one skilled in the art after reading the present description.

Decision 256 further includes determining whether the each of the memory modules have been instructed to perform the first data operation. In some approaches, decision 256 includes determining whether one or more instructions corresponding to the first data operation have been sent to each of the memory modules. In response to determining that at least one of the memory modules has not yet been instructed to perform the first data operation, the flowchart returns to sub-operation 252. There, sub-operation 252 is repeated to advance to a next one of the memory modules, before repeating sub-operation 254 by sending the aforementioned one or more instructions to the next memory module.

It follows that sub-processes 250, 252, 254, and 256 may be repeated any desired number of times, e.g., depending on the number of memory modules are included in a given system. According to an example, which is in no way intended to limit the invention, the system 100 of FIG. 1A includes at least 8 memory modules 108. Thus, sub-processes 250, 252, 254, and 256 may each be performed 8 times in a repeating, iterative fashion.

Returning to decision 256, the flowchart is shown as advancing to decision 204 of FIG. 2A in response to determining that each of the memory modules have been instructed to perform the first data operation. As noted above, although instructions are received to perform a given data operation, it may take some time to actually perform (e.g., satisfy) that request. Thus, although it has been determined that each of the memory modules have received one or more instructions to perform the first data operation, a separate determination is made as to whether the first data operation has actually been implemented (e.g., performed) at each of the memory modules.

Correspondingly, decision 204 includes determining whether the first data operation has been completed at each of the memory modules. Decision 204 may be performed differently depending on the approach. For instance, it may be determined whether a data operation has been completed on each of the memory modules by periodically sending an inquiry, repeatedly checking a flag, waiting for a signal to be received from each of the memory modules or other intermediary components that indicates each of the memory modules has implemented the first data operation, etc.

In response to determining that the first data operation has not been completed at each of the memory modules, method 200 proceeds to operation 206. There, operation 206 includes implementing a wait time before returning to decision 204. In other words, method 200 waits an amount of time predetermined by a user, system architect, electrical device manufacturer, etc. before repeating decision 204. It follows that processes 204 and 206 may be repeated any desired number of times. For instance, in some approaches processes 204 and 206 may be repeated a predetermined number of times before determining that method 200 has experienced a failure and requires the attention of a user, administrator, etc. A warning, error message, request, etc. may be sent in response detecting the failure.

Returning to decision 204, method 200 proceeds to operation 208 in response to determining that the first data operation has been completed (e.g., implemented) at each of the memory modules. There, operation 208 includes sending one or more instructions to each of the memory modules to perform a second data operation. As noted above, the second data operation may correspond to the first data operation in some approaches. For example, the second data operation may be a flash write operation following a flash erase operation has been implemented. It follows that implementing operation 208 may be achieved using any desired one(s) of the approaches described herein (e.g., with respect to operation 202 and/or FIG. 2B above).

Method 200 further includes determining whether each of the memory modules have received the second instructions to perform the second data operation. See decision 210. Determining whether each of the memory modules have received the second instructions to perform the second data operation may be performed in a same or similar manner as determining whether each of the memory modules have received the first instructions to perform the first data operation. Decision 210 may thereby be performed using any of the approaches described above (e.g., with respect to decision 204). Similarly, operation 212 includes implementing a wait time before returning to decision 210 and may include any of the approaches described above (e.g., with respect to operation 206).

Method 200 proceeds from decision 210 to decision 214 in response to determining that each of the memory modules have received the second instructions to perform the second data operation. There, decision 214 includes verifying that the data accessed in the memory modules as a result of performing the first and second operations are the same. In other words, decision 214 includes validating the data across the memory modules. According to an example, decision 214 may include validating a flash checksum in order to confirm data stored at each of the memory modules in flash are identical copies of each other. In another example, a read verify operation may be performed at each of the memory modules to confirm a computer software update was implemented successfully across the locations.

In response to the data validation failing, method 200 proceeds to operation 216. There, a warning that the computer software update was not successful is output. The warning may be output to a user, a service contact, a central controller, a system administrator, etc.

However, from decision 214 the flowchart proceeds to operation 218 in response to determining that the data validation succeeded. At operation 218, method 200 may end. However, it should be noted that although method 200 may end upon reaching operation 218, any one or more of the processes included in method 200 may be repeated in order to process additional data operations. In other words, any one or more of the processes included in method 200 may be repeated for any other received data operations.

It follows that various ones of the approaches included herein are able to significantly improve operating efficiency of the system without limiting performance. This is accomplished at least in part by performing a same number of steps (e.g., operations) in a shorter amount of time than conventionally possible. In other words, implementing approaches included herein will allow for a controller to perform a given number of data operations in a shorter amount of time than conventionally achievable. This effectively reduces the amount of latency that corresponds to each of the data operations that are performed. As the number of data operations that are performed, the size of data storage systems and/or operating architectures in general, etc. significantly increase, the compute performance improvements achieved by the various approaches herein will be compounded, thereby leading to further measurable and significant improvements over what was previously achievable. Performance may be improved even further by implementing machine learning techniques to identify additional operating efficiencies.

It should also be noted that the various implementations herein may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It follows that although various aspects of the implementations herein have been illustrated as including specific designs, orientations, numbers of components, etc., this is in no way intended to limit the invention. Rather, the implementations herein are presented for exemplary purposes only and may vary in design, orientation, number of components, etc., depending on the desired approach. It should also be noted that use of the terms "bottom", "lower", "top", "upper", etc., are in no way intended to be limiting. Any frames of reference used to describe the various implementations herein have been selected for illustrative purposes only and may be adjusted as desired.

It should also be noted that, while the disclosed implementations have been illustrated and described with respect to one or more approaches, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

It should also be understood that various implementations of the present disclosure have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computer-implemented method for synchronously programming multiple memory modules, each of the multiple memory modules including a connector, a sub-controller, and a memory coupled to the sub-controller, the computer-implemented method comprising:

sending one or more first instructions via a baseboard management controller to perform a first data operation associated with a computer software update, the one or more first instructions being sent to the connector of each of the multiple memory modules coupled to a multiplexer and received by the corresponding sub-controller, wherein each of the multiple memory modules are selected by the multiplexer by an output from a controller coupled to the baseboard management controller;

in response to determining that each of the multiple memory modules has received the first instructions to perform the first data operation, performing the first instructions via the corresponding sub-controller, and determining that the first data operation is completed at each of the multiple memory modules;

sending one or more second instructions via the baseboard management controller to perform a second data operation associated with the computer software update after determining the first data operation is completed at each of the multiple memory modules, the one or more second instructions being sent to the connector of each of the multiple memory modules selected by the output of the controller;

in response to determining that each of the multiple memory modules has received the second instructions to perform the second data operation, performing the second instructions via the corresponding sub-controller, and determining that the second data operation is completed at each of the multiple memory modules; and validating data across the multiple memory modules via the baseboard management controller after determining the second data operation is completed.

2. The computer-implemented method of claim 1, wherein sending the one or more first instructions to perform the first data operation, includes:

sending the one or more first instructions to a first memory module of the multiple memory modules to perform the first data operation;

advancing to a second memory module of the multiple memory modules;

sending the one or more first instructions to the second memory module to perform the first data operation;

repeating the following process in an iterative fashion:

determining whether each of the multiple memory modules has been instructed to perform the first data operation, in response to determining that each of the multiple memory modules has not been instructed to perform the first data operation, advancing to a next memory module of the multiple memory modules, and sending the one or more first instructions to the next memory module to perform the first data operation.

3. The computer-implemented method of claim 1, further comprising:

in response to the data validation failing, outputting a warning that the computer software update was not successful.

4. The computer-implemented method of claim 1, wherein the first data operation is an erase operation associated with a firmware update.

5. The computer-implemented method of claim 4, wherein sending one or more second instructions to perform the second data operation, includes:

sending the one or more second instructions to a first memory module of the multiple memory modules to perform the second data operation;

advancing to a second memory module of the multiple memory modules;

sending the one or more second instructions to the second memory module to perform the second data operation;

repeating the following process in an iterative fashion:

determining whether each of the multiple memory modules has been instructed to perform the second data operation, in response to determining that each of the multiple memory modules has not been instructed to perform the second data operation, advancing to a next memory module of the multiple memory modules, and sending the one or more second instructions to the next memory module to perform the second data operation.

6. The computer-implemented method of claim 5, wherein the second data operation is a write operation associated with the firmware update.

7. The computer-implemented method of claim 6, wherein validating the data across the multiple memory modules includes:

sending one or more third instructions to perform a third data operation associated with the computer software update, the one or more third instructions being sent to each of the multiple memory modules.

8. The computer-implemented method of claim 7, wherein the third data operation is a verify read operation.

9. The computer-implemented method of claim 1, wherein each of the multiple memory modules include random access non-volatile memory.

10. The computer-implemented method of claim 9, wherein the random access non-volatile memory is flash memory.

11. The computer-implemented method of claim 10, wherein the operations are performed by a central controller selectively given access to the flash memory.

12. A non-transitory computer program product for synchronously programming multiple memory modules, each of the multiple memory modules including a connector, a sub-controller, and a memory coupled to the sub-controller, the computer program product comprising a computer readable storage medium having program instructions embodied therewith, the program instructions readable and/or executable by a baseboard management controller to cause the baseboard management controller to:

send, by the baseboard management controller, one or more first instructions to perform a first data operation associated with a computer software update, the one or more first instructions being sent to the connector of each of the multiple memory modules coupled to a multiplexer and received by the corresponding sub-controller, wherein each of the multiple memory modules are selected by the multiplexer by an output from a controller coupled to the baseboard management controller;

in response to determining that each of the multiple memory modules has received the first instructions to perform the first data operation via the corresponding sub-controller, determine the first data operation is completed at each of the multiple memory modules;

send, by the baseboard management controller, one or more second instructions to perform a second data operation associated with the computer software update after determining the first data operation is completed at each of the multiple memory modules, the one or more second instructions being sent to the connector of each of the multiple memory modules selected by the output of the controller;

in response to determining that each of the multiple memory modules has received the second instructions to perform the second data operation, determining the second data operation is completed at each of the multiple memory modules; and validate, by the baseboard management controller, data across the multiple memory modules after determining the second data operation to be completed.

13. The computer program product of claim 12, wherein sending the one or more first instructions to perform the first data operation, includes:

sending the one or more first instructions to a first memory module of the multiple memory modules to perform the first data operation;

advancing to a second memory module of the multiple memory modules;

sending the one or more first instructions to the second memory module to perform the first data operation;

repeating the following process in an iterative fashion:

determining whether each of the multiple memory modules has been instructed to perform the first data operation, in response to determining that each of the multiple memory modules has not been instructed to perform the first data operation, advancing to a next memory module of the multiple memory modules, and sending the one or more first instructions to the next memory module to perform the first data operation.

14. The computer program product of claim 12, wherein the first data operation is an erase operation associated with a firmware update.

15. The computer program product of claim 14, wherein sending one or more second instructions to perform the second data operation, includes:

sending the one or more second instructions to a first memory module of the multiple memory modules to perform the second data operation;

advancing to a second memory module of the multiple memory modules;

sending the one or more second instructions to the second memory module to perform the second data operation;

repeating the following process in an iterative fashion:

determining whether each of the multiple memory modules has been instructed to perform the second data operation, in response to determining that each of the multiple memory modules has not been instructed to perform the second data operation, advancing to a next memory module of the multiple memory modules, and sending the one or more second instructions to the next memory module to perform the second data operation.

16. The computer program product of claim 15, wherein the second data operation is a write operation associated with the firmware update.

17. The computer program product of claim 16, wherein validating the data across the multiple memory modules includes:

sending one or more third instructions to perform a verify read operation associated with the computer software update, the one or more third instructions being sent to each of the multiple memory modules.

18. The computer program product of claim 12, wherein each of the memory modules includes flash memory.

19. A system, comprising:

a plurality of memory modules, each of the memory modules having a connector, a sub-controller, and a plurality of random access non-volatile memory blocks coupled to the sub-controller, the memory blocks configured to store data;

a baseboard management controller; and logic integrated with and/or executable by the baseboard management controller, the logic being configured to:

send, by the baseboard management controller, one or more first instructions to perform a first data operation associated with a computer software update, the one or more first instructions being sent to the connector of each of the multiple memory modules and received by the corresponding sub-controller;

in response to determining that each of the multiple memory modules has received the first instructions to perform the first data operation, perform the first instructions via the corresponding sub-controller, and determine the first data operation is completed at each of the multiple memory modules coupled to a multiplexer, wherein each of the multiple memory modules are selected by the multiplexer by an output from a controller coupled to the baseboard management controller;

send, by the baseboard management controller, one or more second instructions to perform a second data operation associated with the computer software update after determining the first data operation is completed at each of the multiple memory modules, the one or more second instructions being sent to the connector of each of the multiple memory modules selected by the output of the controller;

in response to determining that each of the multiple memory modules has received the second instructions to perform the second data operation, perform the second instructions via the corresponding sub-controller, and determine the second data operation is completed at each of the multiple memory modules; and validate, by the baseboard management controller, data across the multiple memory modules after determining the second data operation is completed.

20. The system of claim 19, wherein the first data operation is an erase operation associated with a firmware update, wherein the second data operation is a write operation associated with the firmware update, wherein sending one or more second instructions to perform the second data operation associated with the computer software update, includes:

sending the one or more second instructions to a first memory module of the multiple memory modules to perform the second data operation;

advancing to a second memory module of the multiple memory modules;

sending the one or more second instructions to the second memory module to perform the second data operation;

repeating the following process in an iterative fashion:

determining whether each of the multiple memory modules has been instructed to perform the second data operation, in response to determining that each of the multiple memory modules has not been instructed to perform the second data operation, advancing to a next memory module of the multiple memory modules, and sending the one or more second instructions to the next memory module to perform the second data operation.

* * * * *